Patented Feb. 23, 1937

2,071,907

UNITED STATES PATENT OFFICE 2,071,907

PREPARATION OF POLYMERS IN SHEET OR BLOCK FORM

Harold James Tattersall, Ardrossan, Scotland, assignor to Imperial Chemical Industries Limited, a corporation of Great Britain No Drawing. Application January 15, 1935, Serial No. 1,977. In Great Britain February 12, 1934

4 Claims. (Cl. 18—58)

This invention relates to the preparation of polymers in sheet or block form and, more particularly, relates to an improved process of preparing sheets or blocks of polymerized acrylic and alkacrylic acids, their homologues and derivatives.

An object of the present invention is to provide a process of preparing blocks or sheets of polymerized compounds as mentioned above, of considerable thickness if desired. A further object is to provide a simple and economical process of preparing such sheets or blocks free of blemishes and of excellent appearance. A still further object is to provide a process wherein a sheet or block may be obtained of predetermined caliper, perfectly smooth, and with a high polish, without resorting to the usual steps of grinding the sheet or block to size, smoothing and polishing. Other objects will be apparent from the description of the invention given hereinafter.

The above objects are accomplished according to the present invention by heating a liquid monomeric compound of the class consisting of acrylic and alkacrylic acids, their homologues and derivatives, preferably in the presence of a polymerization catalyst, at a moderate temperature of preferably not in excess of 80° C. until polymerization has progressed to the point where the liquid monomer is of a syrupy consistency. The syrup thus obtained is cooled to approximately room temperature and poured on to a plate provided with sides to confine the syrup within a desired area, a second plate is superposed on the layer of syrup in a manner to exert continuous pressure on the layer, which is below the pressure which causes the syrup to flow. Preferably, the plate is allowed to just rest upon the upper surface of the syrup. The sandwich of plates and layer of syrup is then allowed to stand for about 24 hours at room temperature until the layer of syrup is converted through continuation of the polymerizing action to a more or less solid body, the sandwich is then heated until polymerization is substantially complete and the plates removed from the sheet or block of polymerized compound thus produced. The product so obtained is smooth and highly polished on top and bottom if plates with smooth and polished contacting surfaces have been used. Glass plates are particularly suited for this purpose. Obviously, if decorative effects are desired on one or both surfaces of the sheet, plates with the desired decorative effect on their contacting surfaces may be employed.

Where it is desired to produce finished sheets of about ⅛" caliper or less, the polymerizable syrup may all be poured on the plate at once. On the other hand, if a sheet or block of greater caliper is to be made, then it is preferred to pour out successive layers of polymerizable syrup to a depth that will give a polymerized layer not exceeding ½" in thickness, allowing each layer to stand at about room temperature for 24 hours before pouring the next layer, and the top plate, or the like, only being employed during polymerization of the last layer.

The following examples are given to illustrate two specific embodiments of the invention.

*Example 1.*—A 0.3% solution of benzoyl peroxide in liquid monomeric methyl methacrylate by weight, was allowed to polymerize at a temperature approaching but not exceeding 80° C. until the molecular weight as calculated by Staudinger's method (Annalen der Chemie 1931 Vol. 488, pages 5–56) was 3000. The material was then cooled to 30° C. and the syrup so obtained was poured on to a carefully leveled glass plate resting on a ledge in a wooden frame on a body of plaster of Paris. The dimension of the sheet was 10" x 18" and the layer was poured ½" thick. A second glass plate was lowered on to the surface of the syrup and counterpoised in contact therewith and the assembly allowed to stand for 24 hours at a temperature between 20° C. and 25° C. The sandwich of glass plates and interposed plastic was then removed from the frame and heated to 80–90° C. for 2½ hours, after which the sheet of polymerized methyl methacrylate was detached from the glass plates by springing them apart with a knife blade.

*Example 2.*—The material and apparatus were the same as in Example 1. In this case, however, the glass sheet was not lowered on to the first ½" layer of partly polymerized methyl methacrylate syrup, the surface of the latter merely being protected from the deposition of dust while the assembly was allowed to stand for 24 hours at about 20° C. At the end of this period a second layer of the partly polymerized syrup ½" thick was poured on to the first layer. The top glass sheet of the sandwich was then applied and the assembly allowed to stand for another 24 hours at about 20° C. The sandwich of glass plates and interposed plastic was then removed from the frame and heated for three hours at 80° C. The glass sheets were then removed from the block of polymer thus obtained, as in the preceding example.

It will be understood that the above examples are merely illustrative and that the invention relates broadly to the preparation of sheets or blocks, not only from methyl methacrylate, but also of any liquid polymerized compound from the class consisting of acrylic and alkacrylic acids, their homologues and derivatives. Among such compounds suitable for use in this invention may be mentioned acrylic acid and alkacrylic acids as methacrylic and ethacrylic acids, their derivatives and homologues such as their esters, nitriles, amides, substituted alkyl and aryl amides and, more particularly, the esters of the alkacrylic acids as the alkyl esters of methacrylic and ethacrylic acids. Specifically may be mentioned monomeric methyl, ethyl, and butyl acrylates, methacrylates, and ethacrylates, phenyl methacrylate, glycol di-methacrylate, and methacrylic nitrile.

In place of the benzoyl peroxide used as the polymerizing catalyst there may be employed other catalysts such as hydrogen peroxide, stannic chloride, ozonized methanol, sodium perborate with acetic anhydride, potassium percarbonate, and acetyl benzoyl peroxide. The specific proportion of catalyst employed will, to some extent vary, depending upon the activity of the catalyst in question, although in all cases it will be a relatively small amount as is the general rule in employing catalysts.

The compound should be polymerized to a syrupy consistency before being poured out on the bottom plate. It is desirable to effect this partial polymerization at a temperature not exceeding 80° C. in order to obtain a flawless product; the partial polymerization may be carried out at substantially lower temperatures although this necessarily retards the rate of polymerization and is more time consuming.

Where the finished polymerized sheet is to be ⅓" or less in thickness, it has been found that the syrup may be poured out to a depth sufficient to give this thickness and the process carried out to give a blemish free sheet. On the other hand, if a finished sheet or block of a thickness greater than ⅓" is desired, it is difficult to obtain a blemish free article by pouring out the syrup to the required depth all at one time. However, by pouring out the syrup to a depth of about ½" which will give a finished layer of ⅓" thickness, due to contraction during polymerization, allowing that to stand at room temperature for about 24 hours, and repeating this with subsequent layers of the syrup of the same depth until a block of the desired thickness is built up and superposing a plate on the last layer after it is poured and following with the heat treatment, a flawless article of any desired thickness may be obtained.

The partially polymerized syrup should be cooled to about room temperature before pouring and the sandwich of plates and interposed material should be allowed to stand at room temperature for about 24 hours. A temperature ranging from 20° C. to 35° C. can be considered room temperature for this purpose. Upon standing, the syrup becomes converted to substantially a solid body in about a day's time so as to permit removal of the sandwich from the framework employed and facilitate heating the sandwich. The sandwich should be heated for a relatively short period of about 1½ to 3½ hours at a temperature of at least about 80° C. and preferably between 80 and 90° C. to enable the glass plates to be removed with ease and to give the polymerized body a hard, scratch resistant surface.

As will be understood by those skilled in the art, the various modifiers, coloring matter, effect materials, and the like, to give a product of particular physical properties or appearance may be employed in the present process.

The herein described process has many peculiar advantages. The upper plate exerting a continuous pressure on the surface of the polymerizing material counteracts the tendency toward horizontal shrinkage and allows a sheet of predetermined caliper to be obtained by determining the percent shrinkage of the syrup in being converted to the hard, polymerized, finished product. This means that a sheet or block can be made positively of certain dimensions and caliper without the necessity of any grinding operation heretofore considered essential. By employing plates with smooth, polished contacting surfaces, a sheet or block with smooth, highly polished surface is obtained without the necessity of any smoothing or polishing steps. Moreover, by the use of the upper plate in actual contact with the material being polymerized, volatilization of the monomer is reduced to a minimum, dust and the like cannot accumulate on either surface of the sheet or block being formed, and there can be no dropping back of condensed monomer on the surface of the sheet or block to injure the finish.

If, instead of a sheet or block with a highly polished surface, one with an ornamental effect such as engine turning is desired, the present process is equally advantageous as plates with the desired ornamental effect cut in their contacting surface can be substituted for plates with a smooth, polished contacting surface.

As many apparently widely different embodiments of this invention may be made without departing from the spirit and scope thereof, it is to be understood that the invention is not limited to the specific embodiments thereof except as defined in the appended claims.

I claim:

1. Process of preparing a sheet or block of polymerized material which comprises heating monomeric methyl methacrylate together with a polymerizing catalyst therefor to form a syrup of partially polymerized ester, pouring a layer of said syrup on a plate provided with means to confine the syrup within a desired area, superposing on said layer of syrup a second plate adapted to exert continuous pressure on said layer, allowing the sandwich of plates and interposed material to stand at room temperature until the syrup has been converted into a substantially solid body through polymerization, heating said sandwich until polymerization of the ester is substantially complete, and removing the plates from the body of polymerized ester thus formed.

2. Process of preparing a sheet or block of polymerized material which comprises heating monomeric methyl methacrylate together with a polymerizing catalyst therefor to form a syrup of partially polymerized ester, pouring a layer of said syrup on a glass plate provided with means to confine the syrup within a desired area, superposing on said layer of syrup a second glass plate adapted to exert continuous pressure on said layer, allowing the sandwich of plates and interposed material to stand at room temperature until the layer of syrup has been converted into a substantially solid body through polymerization, heating said sandwich at a temperature of at least 80° C. until polymerization of the ester is substantially complete, and removing the plates from the body of polymerized ester thus formed.

3. Process of preparing a sheet or block of polymerized material which comprises heating monomeric methyl methacrylate together with a polymerizing catalyst therefor to form a syrup of partially polymerized ester, pouring a layer of said syrup to a depth of not more than ½″ on a smooth polished glass plate provided with means to confine the syrup within a desired area, superposing on said layer of syrup a second smooth polished glass plate adapted to exert continuous pressure on said layer, allowing the sandwich of plates and interposed material to stand at room temperature for about 24 hours, heating said sandwich at a temperature of 80–90° C. for about 2½ hours, and removing the plates from the body of polymerized ester thus formed.

4. Process of preparing a sheet or block of polymerized material which comprises heating monomeric methyl methacrylate together with a polymerizing catalyst therefor to form a syrup of partially polymerized ester, pouring a layer of said syrup to a depth of not more than ½″ on a plate provided with means to confine the syrup within a desired area, allowing the assembly to stand at room temperature until the syrup has been converted into a substantially solid body through polymerization, pouring a second layer of said syrup to a depth of not more than ½″ on the solidified layer, allowing said assembly to stand at room temperature until the second layer of syrup has been converted into a substantially solid body through polymerization, repeating said last two steps until a body of a thickness not more than ⅓″ less than the final thickness desired has been built up, pouring a final layer of said syrup on the solidified body to a depth such as to give upon polymerization a body of the desired total thickness, superposing on said final layer a second plate adapted to exert continuous pressure on said final layer, allowing the sandwich of plates and interposed material to stand at room temperature until said final layer has been converted into a substantially solid body through polymerization, heating said sandwich until polymerization is substantially complete, and removing the plates from the body of polymerized ester thus formed.

HAROLD JAMES TATTERSALL.

CERTIFICATE OF CORRECTION.

Patent No. 2,071,907.   February 23, 1937.

HAROLD JAMES TATTERSALL.

It is hereby certified that error appears in the printed specification of the above numbered patent requiring correction as follows: Page 2, first column, line 3, for "polymerized" read polymerizable; and that the said Letters Patent should be read with this correction therein that the same may conform to the record of the case in the Patent Office.

Signed and sealed this 1st day of June, A. D. 1937.

(Seal)

Henry Van Arsdale
Acting Commissioner of Patents.

substantially complete, and removing the plates from the body of polymerized ester thus formed.

3. Process of preparing a sheet or block of polymerized material which comprises heating monomeric methyl methacrylate together with a polymerizing catalyst therefor to form a syrup of partially polymerized ester, pouring a layer of said syrup to a depth of not more than ½" on a smooth polished glass plate provided with means to confine the syrup within a desired area, superposing on said layer of syrup a second smooth polished glass plate adapted to exert continuous pressure on said layer, allowing the sandwich of plates and interposed material to stand at room temperature for about 24 hours, heating said sandwich at a temperature of 80–90° C. for about 2½ hours, and removing the plates from the body of polymerized ester thus formed.

4. Process of preparing a sheet or block of polymerized material which comprises heating monomeric methyl methacrylate together with a polymerizing catalyst therefor to form a syrup of partially polymerized ester, pouring a layer of said syrup to a depth of not more than ½" on a plate provided with means to confine the syrup within a desired area, allowing the assembly to stand at room temperature until the syrup has been converted into a substantially solid body through polymerization, pouring a second layer of said syrup to a depth of not more than ½" on the solidified layer, allowing said assembly to stand at room temperature until the second layer of syrup has been converted into a substantially solid body through polymerization, repeating said last two steps until a body of a thickness not more than ⅓" less than the final thickness desired has been built up, pouring a final layer of said syrup on the solidified body to a depth such as to give upon polymerization a body of the desired total thickness, superposing on said final layer a second plate adapted to exert continuous pressure on said final layer, allowing the sandwich of plates and interposed material to stand at room temperature until said final layer has been converted into a substantially solid body through polymerization, heating said sandwich until polymerization is substantially complete, and removing the plates from the body of polymerized ester thus formed.

HAROLD JAMES TATTERSALL.

CERTIFICATE OF CORRECTION.

Patent No. 2,071,907.  February 23, 1937.

HAROLD JAMES TATTERSALL.

It is hereby certified that error appears in the printed specification of the above numbered patent requiring correction as follows: Page 2, first column, line 3, for "polymerized" read polymerizable; and that the said Letters Patent should be read with this correction therein that the same may conform to the record of the case in the Patent Office.

Signed and sealed this 1st day of June, A. D. 1937.

(Seal)

Henry Van Arsdale
Acting Commissioner of Patents.

CERTIFICATE OF CORRECTION.

Patent No. 2,071,907.  February 23, 1937.

HAROLD JAMES TATTERSALL.

It is hereby certified that error appears in the printed specification of the above numbered patent requiring correction as follows: Page 2, first column, line 3, for "polymerized" read polymerizable; and that the said Letters Patent should be read with this correction therein that the same may conform to the record of the case in the Patent Office.

Signed and sealed this 1st day of June, A. D. 1937.

(Seal)

Henry Van Arsdale
Acting Commissioner of Patents.